(12) United States Patent
Han et al.

(10) Patent No.: US 9,648,586 B2
(45) Date of Patent: May 9, 2017

(54) METHOD FOR WIRELESS COMMUNICATION BETWEEN A USER DEVICE AND A BASE STATION IN A WIRELESS COMMUNICATION SYSTEM SUPPORTING UPLINK AND DOWNLINK MULTI CARRIERS, AND A DEVICE FOR IMPLEMENTING THE METHOD

(71) Applicant: LG ELECTRONICS INC., Seoul (KR)

(72) Inventors: Seung Hee Han, Anyang-si (KR); Sung Ho Moon, Anyang-si (KR); Jae Hoon Chung, Anyang-si (KR); So Yeon Kim, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/255,839

(22) Filed: Apr. 17, 2014

(65) Prior Publication Data

US 2014/0226593 A1 Aug. 14, 2014

Related U.S. Application Data

(63) Continuation of application No. 13/386,400, filed as application No. PCT/KR2010/005385 on Aug. 16, 2010, now Pat. No. 8,743,811.

(Continued)

(30) Foreign Application Priority Data

Mar. 19, 2010 (KR) .................. 10-2010-0024652

(51) Int. Cl.
*H04W 72/02* (2009.01)
*H04W 74/00* (2009.01)
*H04L 5/00* (2006.01)

(52) U.S. Cl.
CPC ......... *H04W 72/02* (2013.01); *H04W 74/006* (2013.01); *H04L 5/001* (2013.01)

(58) Field of Classification Search
CPC ..... H04L 5/0053; H04L 5/001; H04L 1/1861; H04L 5/0057; H04W 72/0413; H04W 72/042; H04W 72/0453
(Continued)

(56) References Cited

U.S. PATENT DOCUMENTS

2008/0273513 A1  11/2008  Montojo et al.
2009/0129259 A1  5/2009  Malladi et al.
(Continued)

FOREIGN PATENT DOCUMENTS

KR  1020080073439  8/2008

OTHER PUBLICATIONS

LG Electronics, "Physical cell ID allocation to the aggregated component carriers," 3GPP TSG RAN WG1 #57bis, R1-092875, Jun. 2009, 4 pages.

(Continued)

*Primary Examiner* — Andrew Chriss
*Assistant Examiner* — Romani Ohri
(74) *Attorney, Agent, or Firm* — Lee Hong Degerman Kang Waimey

(57) ABSTRACT

A method for wireless communication supporting uplink and downlink multi carriers Includes performing initial access through one of at least two downlink component carriers among multiple downlink component carriers including the at least two downlink component carriers through which the user equipment is allowed to perform the initial access; and transmitting via an uplink component carrier allocated to the user equipment by using a carrier identifier, wherein the carrier identifier is applied to the uplink component carrier and is obtained from the downlink (Continued)

component carrier through which the initial access is performed, and wherein the system pre-defines one-to-one correspondence between multiple downlink component carriers and multiple uplink component carriers, and wherein the downlink component carrier through which the initial access is performed and the uplink component carriers allocated to the user equipment do not match the one-to-one correspondence pre-defined by the system.

6 Claims, 21 Drawing Sheets

Related U.S. Application Data

(60) Provisional application No. 61/233,841, filed on Aug. 14, 2009.

(58) Field of Classification Search
USPC .................. 370/252, 329, 330, 344; 455/522
See application file for complete search history.

(56) References Cited

U.S. PATENT DOCUMENTS

| | | |
|---|---|---|
| 2009/0180459 A1 | 7/2009 | Orlik et al. |
| 2010/0195566 A1 | 8/2010 | Krishnamurthy et al. |
| 2010/0322158 A1* | 12/2010 | Lee .................. H04L 5/001 370/329 |
| 2010/0323744 A1* | 12/2010 | Kim et al. .................. 455/522 |
| 2011/0086657 A1* | 4/2011 | Koivisto et al. .............. 455/507 |
| 2011/0134877 A1* | 6/2011 | Noh et al. .................... 370/329 |
| 2011/0194514 A1* | 8/2011 | Lee et al. ..................... 370/329 |
| 2011/0267957 A1* | 11/2011 | Du .................. H04L 5/0007 370/241 |
| 2011/0317777 A1* | 12/2011 | Huang et al. ................. 375/259 |

OTHER PUBLICATIONS

LG Electronics, "Issues on the physical cell ID allocation to the aggregated component carriers," 3GPP TSG RAN WG1 #55, R1-084195, Nov. 2008, 5 pages.

LG Electronics, "Initial Access Procedure in LTE-Advanced," 3GPP TSG RAN WG1 Meeting #55, R1-084196, Nov. 2008, 4 pages.

Korean Intellectual Property Office Application No. 10-2010-024652, Notice of Allowance dated Sep. 28, 2016, 3 pages.

Catt, "Physical cell ID in Carrier aggregation", R1-090192, 3GPP TSG RAN WG1 #55bis, Jan. 2009, 5 pages.

\* cited by examiner

Two antenna port

Four antenna port

Antenna port 0

Antenna port 1

Two antenna port ual identifier (i.e., Radio

METHOD FOR WIRELESS COMMUNICATION BETWEEN A USER DEVICE AND A BASE STATION IN A WIRELESS COMMUNICATION SYSTEM SUPPORTING UPLINK AND DOWNLINK MULTI CARRIERS, AND A DEVICE FOR IMPLEMENTING THE METHOD

CROSS-REFERENCE TO RELATED APPLICATIONS

This application is a continuation of U.S. patent application Ser. No. 13/386,400, filed on Jan. 20, 2012, now U.S. Pat. No. 8,743,811, which is the National Stage filing under 35 U.S.C. 371 of International Application No. PCT/KR2010/005385, filed on Aug. 16, 2010, which claims the benefit of earlier filing date and right of priority to Korean Application No. 10-2010-0024652, filed on Mar. 19, 2010, and also claims the benefit of U.S. Provisional Application Ser. No. 61/233,841, filed on Aug. 14, 2009, the contents of which are all hereby incorporated by reference herein in their entirety.

FIELD OF THE INVENTION

In a wireless mobile communication system and, more particularly, in a wireless communication system supporting uplink and downlink multi carriers, the present invention relates to a method for wireless communication between a user device and a base station, and a device for implementing the method.

BACKGROUND ART

LTE Physical Structure

A 3GPP supports a type 1 Radio Frame Structure that is applicable to an FDD (Frequency Division Duplex) and a type 2 Radio Frame Structure that is applicable to a TDD (Time Division Duplex).

FIG. 1 illustrates the structure of a type 1 radio frame. The type 1 radio frame consists of 10 subframes, and each subframe consists of 2 slots.

FIG. 2 illustrates the structure of a type 2 radio frame. The type 2 radio frame consists of 2 half frames, and each half frame consists of 5 subframes, a DwPTS (Downlink Pilot Time Slot), a Guard Period (GP), and an UpPTS (Uplink Pilot Time Slot). Herein, one subframe consists of 2 slots. The DwPTS is used for initial cell search, synchronization, or channel estimation performed by a user equipment. The UpPTS is used for channel estimation performed by a base station and for uplink transmission synchronization performed by the user equipment. The guard period corresponds to a period for eliminating interference occurring in an uplink due to a multiple path delay of a downlink signal between an uplink and a downlink. Meanwhile, regardless of the type of the radio frame, one frame is configured of 2 slots.

FIG. 3 illustrates a slot structure of an LTE downlink. As shown in FIG. 3, a signal being transmitted from each slot may be expressed by a Resource Grid, which consists of $N_{RB}^{DL} N_{SC}^{RB}$ number of subcarriers and $N_{symb}^{DL}$ number of OFDM (Orthogonal Frequency Division Multiplexing) symbols. Herein, $N_{RB}^{DL}$ represents a number of Resource Blocks (RBs) within a downlink, $N_{SC}^{RB}$ represents a number of subcarriers configuring one RB, and $N_{symb}^{DL}$ represents a number of OFDM symbols included in a downlink slot.

FIG. 4 illustrates a slot structure of an LTE uplink. As shown in FIG. 4, a signal being transmitted from each slot may be expressed by a Resource Grid, which consists of $N_{RB}^{UL} N_{SC}^{RB}$ number of subcarriers and $N_{symb}^{UL}$ number of SC-FDMA (Single Orthogonal Frequency Division Multiplexing Access) symbols. Herein, $N_{RB}^{UL}$ represents a number of Resource Blocks (RBs) within an uplink, $N_{SC}^{RB}$ represents a number of subcarriers configuring one RB, and $N_{symb}^{UL}$ represents a number of SC-FDMA symbols included in an uplink slot.

A Resource Element is a resource unit that is defined by indexes (a, b) within the downlink slot and the uplink slot. Herein, a indicates an index within a frequency axis, and b represents an index within a time axis.

FIG. 5 illustrates the structure of a downlink subframe. Referring to FIG. 5, in a subframe, a maximum of 3 OFDM symbols located at the beginning of a first slot correspond to a control region allocated to a control channel. The remaining OFDM symbols correspond to a data region allocated to a Physical Downlink Shared Channel (PDSCH). Examples of a downlink control channel used by a 3GPP LTE may include a PCFICH (Physical Control Format Indicator Channel), a PDCCH (Physical Downlink Control Channel), a PHICH (Physical Hybrid ARQ Indicator Channel), and so on.

The PCFICH is transmitted from a first OFDM symbol of one subframe, and the PCFICH transmits information related to a number of OFDM symbols that are used for transmitting a control channel within the corresponding subframe. As a response to an uplink transmission, the PHICH transmits an HARQ ACK (Acknowledgement)/NACK (Negative Acknowledgement) signal. The control information being transmitted through the PDCCH is referred to as DCI (Downlink Control Information), which may include uplink or downlink scheduling information or information on uplink transmission power control commands on random UE groups. The PDCCH may carry and deliver transmission format information, resource allocation information of a Downlink Shared Channel (DL-SCH), paging information within a PCH (Paging Channel), system information within the DL-SCH, resource allocation information on higher layer control messages, such as random access responses being transmitted over the PDSCH, a group of transmission power control commands on individual UEs within random UE groups, information on transmission power control commands, information on the activation of a VoIP (Voice of Internet Protocol), and so on. Multiple PDCCHs may be transmitted with the control region. The UE may monitor multiple PDCCHs. Herein, a PDCCH is transmitted by one or multiple groups of consecutive Control Channel Elements (CCEs). The CCE refers to a logical allocation unit, which is used for providing a coding rate to the PDCCH based upon the state of the corresponding wireless channel. Herein, a CCE corresponds to multiple resource element groups. The format of a PDCCH and a number of available bits in the PDCCH may be decided in accordance with a correlation between the number of CCEs and the coding rate that is provided by the CCE. Then, the base station decides the PDCCH format based upon the DCI that is transmitted to the UE, and, then, the base station attaches (or adds) a CRC (Cyclic Redundancy Check) to the control information.

The CRC is masked with a unique identifier (i.e., Radio Network Temporary Identifier (RNTI)) in accordance with the usage or owner of the PDCCH. If the PDCCH is specified for a specific UE, a unique identifier (e.g., C-RNTI (Cell-RNTI)) is masked by using the CRC. And, if the PDCCH is specified for a paging message, a paging indicator identifier (e.g., a Paging-RNTI (P-RNTI)) is masked to the CRS. Also, if the PDCC is specified for the system information (more specifically, hereinafter referred to as a System Information Block (SIB)), a system information identifier and a system information RNTI (S-RNTI) may be masked to the CRC. Also, in order to display a random access response, which corresponds to a response of the UE to the transmission of a random access preamble, a random access RNTI (RA-RNTI) may be masked to the CRS.

FIG. 6 illustrates a structure of an uplink subframe. As shown in FIG. 6, within a frequency domain, an uplink subframe may be divided into a control region and a data region. The control region is allocated to a PUCCH (Physical Uplink Control Channel) for transmitting uplink control information. The data region is allocated to a PUSCH (Physical Uplink Shared Channel) for transmitting data. In order to maintain the attributes of a single carrier, the UE does not transmit the PUCCH and the PUSCH at the same time. The PUCCH for one UE is allocated as an RB pair within one subframe. The RBs included in the RB pair each occupies a different subcarrier within two slots. It may be said that the RB pair allocated to the PUCCH performed frequency hopping at a slot boundary.

A multiple-carrier system or a carrier aggregation system refers to a system aggregating one or more carriers having a target bandwidth smaller than a target bandwidth, when configuring a broadband that is targeted in order to support a broadband. When aggregating one or more carriers each having a bandwidth smaller than the target bandwidth, the bandwidth of the aggregated carrier may be limited to the bandwidth uses in the conventional system in order to provide backward compatibility with the conventional IMT system. For example, the conventional 3GPP LTE system supports bandwidths of 1.4, 3, 5, 10, 15, and 20 MHz, and, in an LTE-A (LTE-Advanced) system, which is an enhanced (or evolved) version of the LTE system, by using only the above-described bandwidths supported by the LTE, an bandwidth larger than 20 MHz may be supported. Also, regardless of the bandwidth uses in the conventional system, a new bandwidth may be defined so as to support carrier aggregation.

In the conventional system, a one-to-one correspondence between uplink carriers and downlink carriers is defined in advance for each frequency band. However, in the one-to-one correspondence is not established between the uplink carriers and the downlink carriers, a problem may occur in the operations associated with the carrier identifier. Therefore, a method for resolving such problems is required.

DETAILED DESCRIPTION OF THE INVENTION

Technical Objects

An object of the present invention is to provide a wireless communication method between a base station and a user device (or user equipment) according to which operations related to a carrier identifier can be easily performed, in a carrier aggregation system, in case a number of uplink carriers does not match with a number of downlink carriers.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the object of the present invention, according to an aspect of the present invention, in a wireless communication system supporting uplink and downlink multi carriers, a wireless communication method between a user equipment and a base station includes the steps of, among multiple downlink component carriers including at least two or more downlink component carriers, through which a user equipment can perform initial access, performing initial access through one of the at least two or more downlink component carriers; and transmitting an uplink component carrier to the user equipment by using a carrier identifier, which is applied to an uplink component carrier received from the downlink component carrier, the downlink component carrier having performed the initial access, and wherein, the system pre-defines multiple downlink component carriers and multiple uplink component carriers, so that the multiple downlink component carriers establish a one-to-one correspondence with the multiple uplink component carriers, and wherein the downlink component carriers having performed initial access do not establish the one-to-one correspondence, which is pre-defined by the system, with the uplink component carriers allocated to the user equipment.

According to another embodiment of the present invention, in a wireless communication system supporting uplink and downlink multi carriers, a user equipment includes a receiving unit configured to receive, among multiple downlink component carriers including at least two or more downlink component carriers, through which a user equipment can perform initial access, one of the at least two or more downlink component carriers; a control unit being electrically connected to the receiving unit and configured to perform initial access by using the received downlink component carrier; and a transmitting unit being electrically connected to the control unit and configured to transmit an uplink component carrier to the user equipment by using a carrier identifier, which is applied to an uplink component carrier received from the downlink component carrier, the downlink component carrier having performed the initial access, and wherein the downlink component carriers having performed initial access do not establish the one-to-one correspondence, which is pre-defined by the system, with the uplink component carriers allocated to the user equipment.

A carrier identifier applied to the uplink component carrier may correspond to a carrier identifier, which is detected from a downlink synchronization signal included in the downlink component carrier, the downlink component carrier having performed the initial access.

The carrier identifier, which is applied to the uplink component carrier received from the downlink component carrier, the downlink component carrier having performed the initial access, may correspond to a carrier identifier, which is applied to a downlink component carrier establishing a one-to-one correspondence with the uplink component carrier pre-defined by the system, the uplink component carrier being allocated to the user equipment.

A carrier identifier applied to the uplink component carrier may be broadcasted or signaled through the downlink component carrier having performed the initial access.

The carrier identifier may correspond to a Physical Cell Identifier (PCI) or a Global Cell Identifier (GCI).

Advantageous Effects

According to the embodiments of the present invention, even if the number of uplink carriers does not configure a one-to-one correspondence, in a carrier aggregation system, the present invention may easily perform operations related to the carrier identifier, thereby realizing efficiency and stability in the system.

Additional effects of the present application will be set forth in part in the description which follows and in part will become apparent to those having ordinary skill in the art upon examination of the following or may be learned from practice of the present application.

BEST MODE FOR CARRYING OUT THE PRESENT INVENTION

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, although the following description is given based upon specific terms, the description of the present invention is not required to be limited only to such terms, and the same meaning may also be indicated by other arbitrary terms. Furthermore, the same reference numbers may be used for the same or similar elements throughout the entire description of the present invention.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", and so on, which are indicated in the description of the present invention, indicates units that process at least one function or operation. And, this may be realized in the form of hardware or software, or a combination of hardware and software.

In the description of the present invention, the multi carrier may be used along (or in combination) with carrier aggregation and bandwidth aggregation. Also, carrier aggregation is a term used to collectively refer to both contiguous carrier aggregation and non-contiguous carrier aggregation.

In order to efficiently use multi carriers, multiple carriers may be managed by one MAC (Multiple Access Control), and such method will hereinafter be described in detail.

Figure 1:
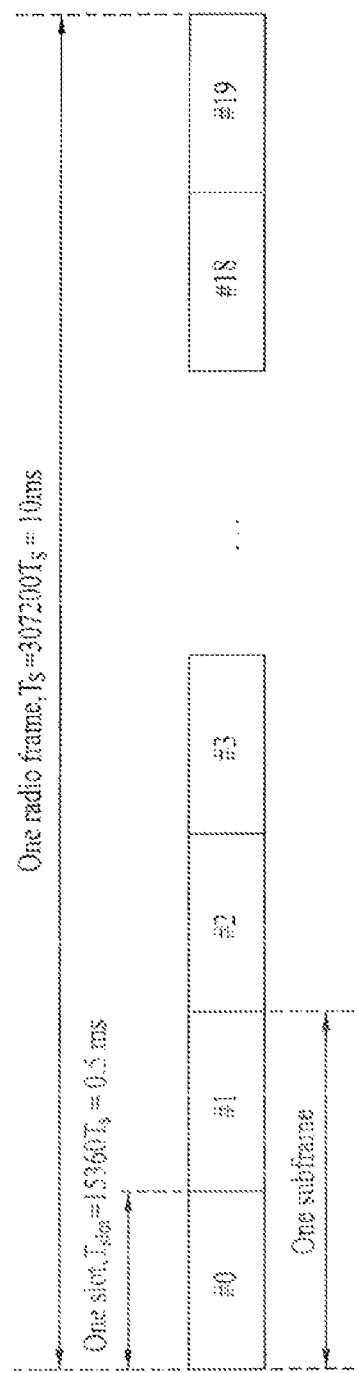
FIG. 1 illustrates the structure of a type 1 radio frame.
Figure 2:
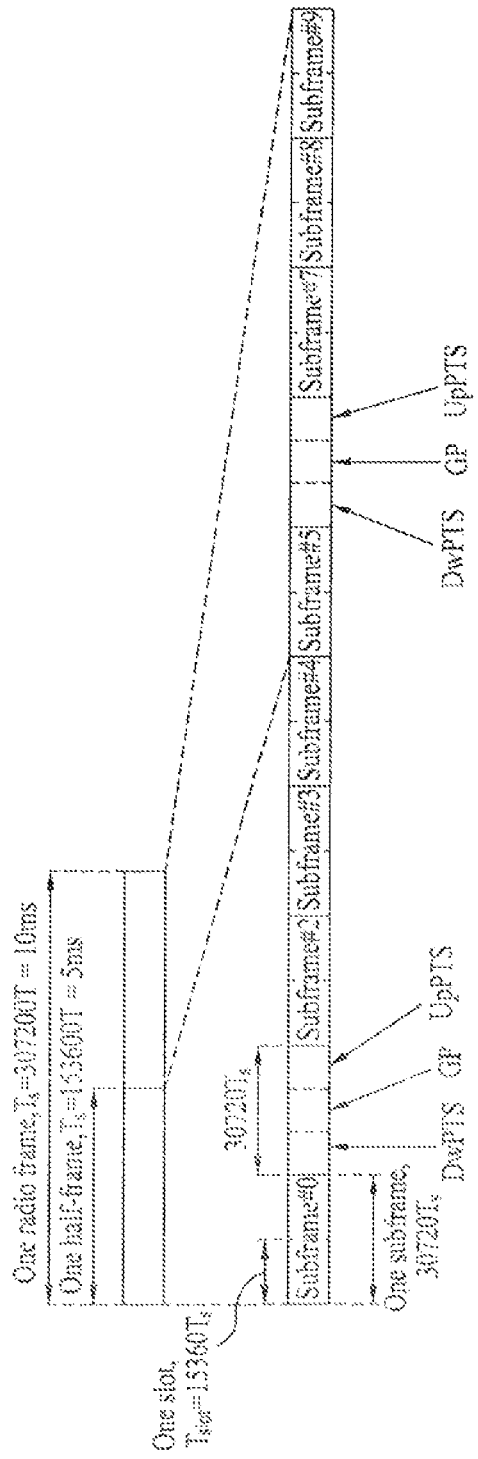
FIG. 2 illustrates the structure of a type 2 radio frame.
Figure 3:
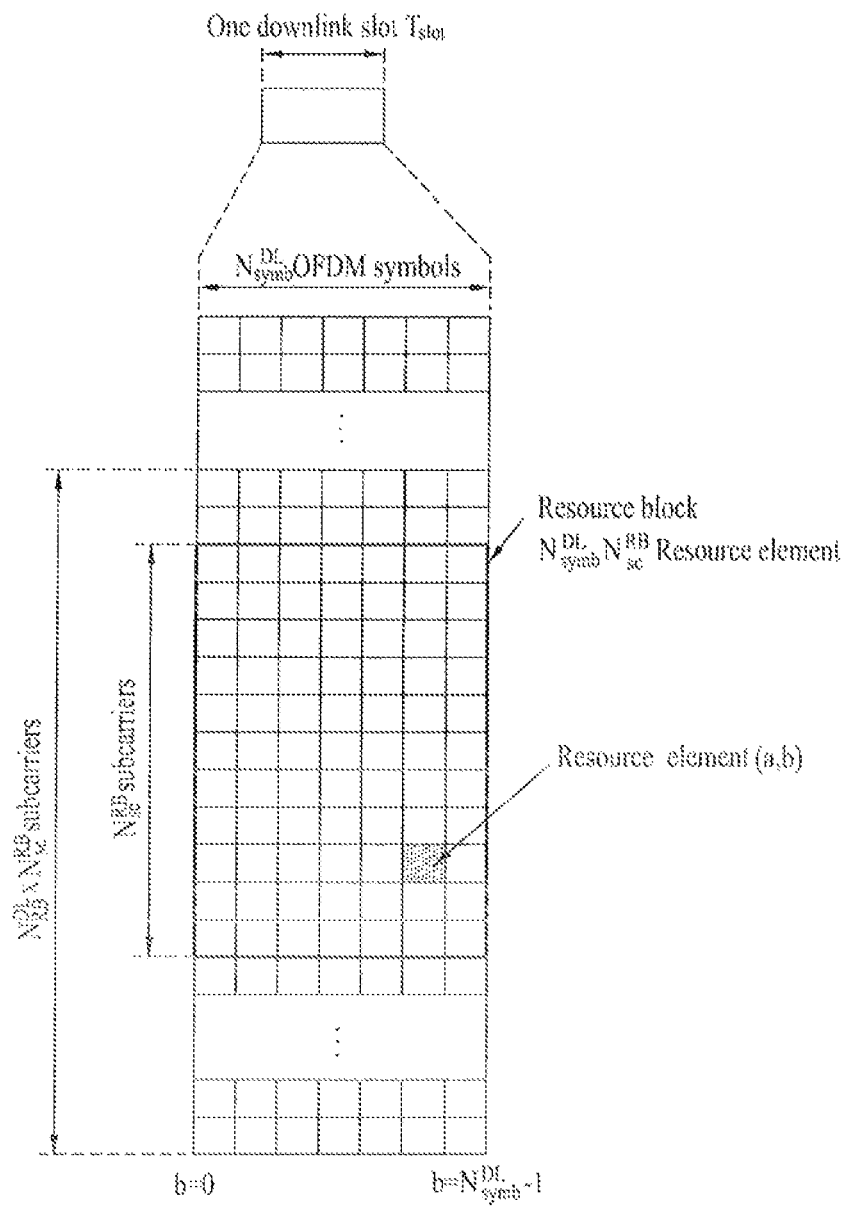
FIG. 3 illustrates a slot structure of an LTE downlink.
Figure 4:
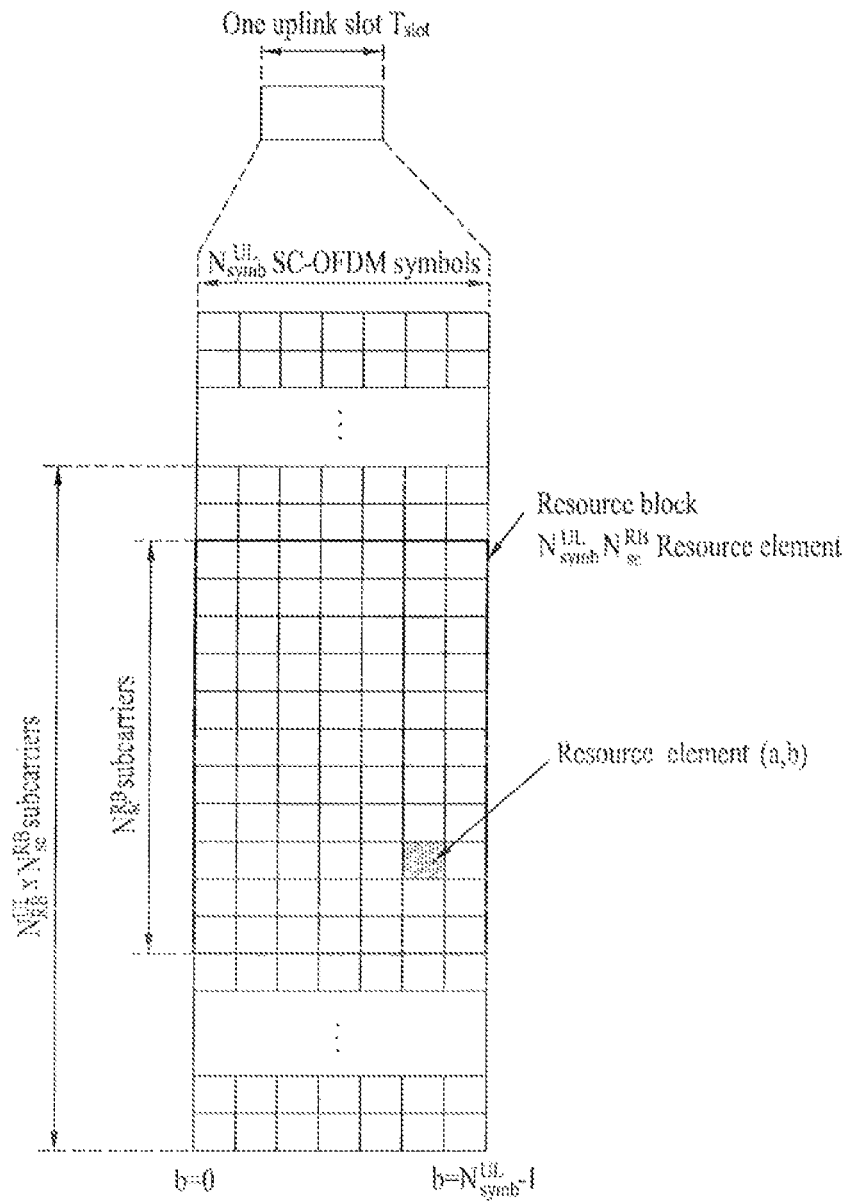
FIG. 4 illustrates a slot structure of an LTE uplink.
Figure 5:
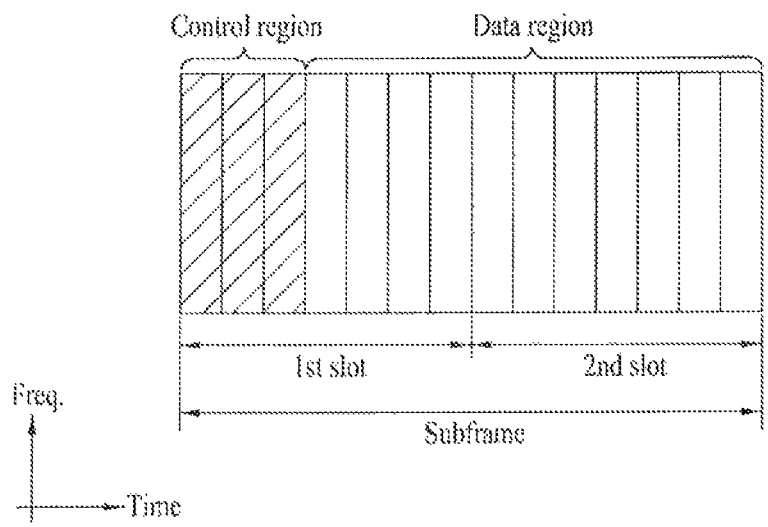
FIG. 5 illustrates an exemplary structure of a downlink subframe.
Figure 6:
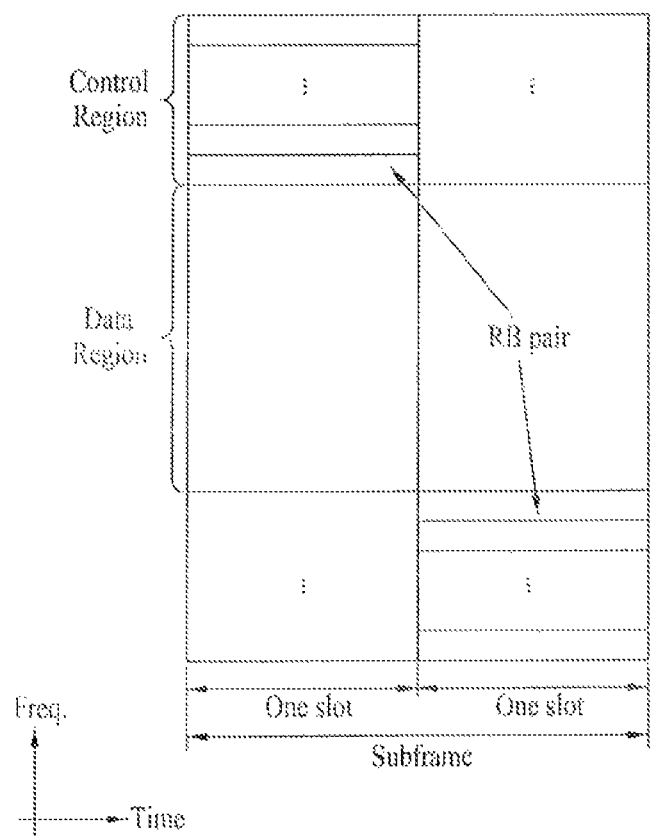
FIG. 6 illustrates a structure of an uplink subframe.
Figure 7:
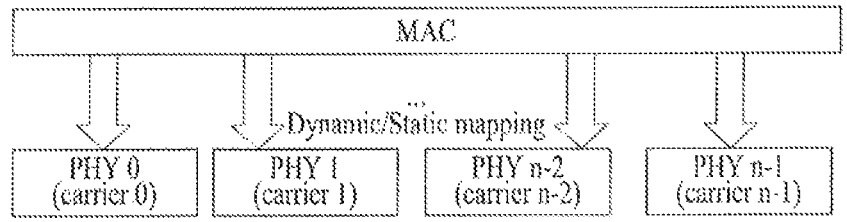
FIG. 7 illustrates a conceptual view of one MAC managing multiple carriers taken from the viewpoint of a transmission performed by a base station.
Figure 8:
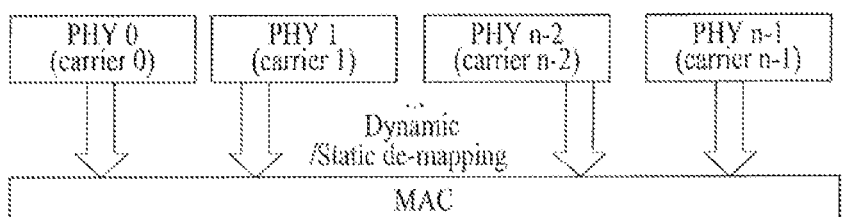
FIG. 8 illustrates a conceptual view of one MAC managing multiple carriers taken from the viewpoint of a reception performed by a user equipment.

FIG. 7 illustrates a conceptual view of one MAC managing multiple carriers taken from the viewpoint of a transmission performed by a base station. FIG. 8 illustrates a conceptual view of one MAC managing multiple carriers taken from the viewpoint of a reception performed by a user equipment. At this point, in order to effectively transmit and receive multiple carriers, a transmitter and a receiver should both be capable of transmitting and receiving multiple carriers.

In other words, one MAC may perform transmission and reception by managing and operating one or more frequency carriers. Also, since the frequency carriers that are managed by one MAC are not required to be contiguous to one another, this method is more advantageous in that the management of resources can be more flexible. In FIG. 7 and FIG. 8, one PHY will be used to refer to one component carrier for simplicity. Herein, one PHY does not always signify an independent RF (Radio Frequency) device. Generally, one independent RF device refers to one PHY. However, this is merely exemplary, and the present invention will not be limited only to this example. And, therefore, one RF device may include multiple PHYs.

Figure 9:
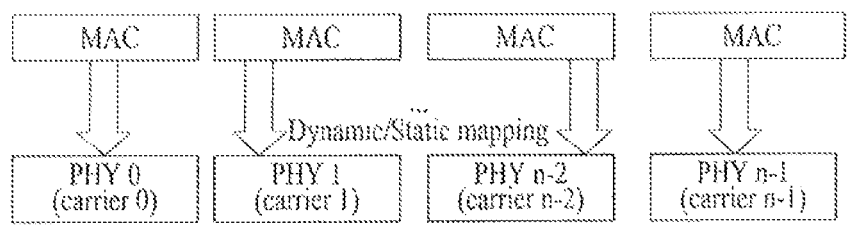
FIG. 9 illustrates a conceptual view of one or more MACs managing multiple carriers taken from the viewpoint of a transmission performed by a base station.
Figure 10:
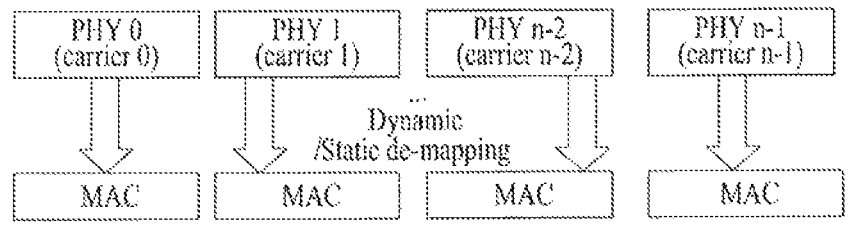
FIG. 10 illustrates a conceptual view of one or more MACs managing multiple carriers taken from the viewpoint of a reception performed by a user equipment.
Figure 11:
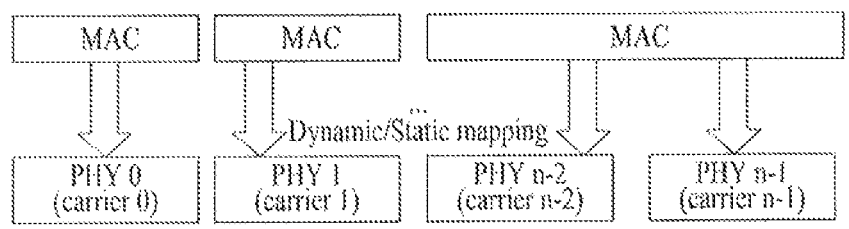
FIG. 11 illustrates a conceptual view of one or more MACs managing multiple carriers taken from the viewpoint of a transmission performed by a base station.
Figure 12:
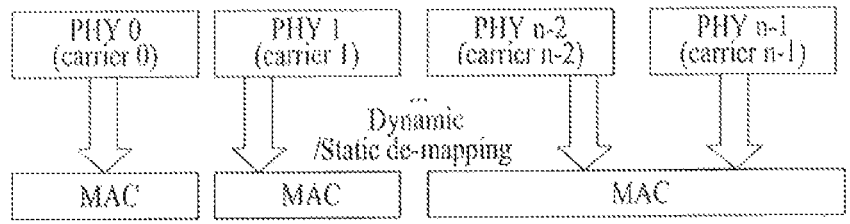
FIG. 12 illustrates a conceptual view of one or more MACs managing multiple carriers taken from the viewpoint of a reception performed by a user equipment.

FIG. 9 illustrates a conceptual view of one or more MACs managing multiple carriers taken from the viewpoint of a transmission performed by a base station. FIG. 10 illustrates a conceptual view of one or more MACs managing multiple carriers taken from the viewpoint of a reception performed by a user equipment. FIG. 11 illustrates a conceptual view of one or more MACs managing multiple carriers taken from the viewpoint of a transmission performed by a base station. FIG. 12 illustrates a conceptual view of one or more MACs managing multiple carriers taken from the viewpoint of a reception performed by a user equipment.

In addition to the structures shown in FIG. 7 and FIG. 8, multiple carriers may be controlled by more than one MACs, instead of being controlled by only one MAC.

As shown in FIG. 9 and FIG. 10, each carrier may be controlled by each MAC at a one-to-one correspondence. And, as shown in FIG. 11 and FIG. 12, for a portion of the carrier, each MAC may control each carrier of the corresponding portion at a one-to-one correspondence, and the remaining one or more carriers may be controlled by a single MAC.

The above-described system corresponds to a system included multiple carriers from 1 carrier to N number of carriers. Herein, each carrier may be contiguous to one another or may not be contiguous to one another. This may be applied to both uplink and downlink transmission. In case of the TDD (Time Division Duplex) system, each carrier includes a downlink transmission and an uplink transmission, and N number of multiple carriers is operated. And, in case of the FDD (Frequency Division Duplex) system, multiple carriers may be used in each of the downlink transmission and the uplink transmission. Also, in case of an H-FDD (Half-FDD) system, which is a system configured of a combination of the FDD and the TDD, the system is configured so that the downlink and uplink support can be changed at the same time depending upon the time or the frequency. For example, in the FDD, a first frequency (Frequency 1) may be used for a downlink, and a first frequency (Frequency 2) may be used for an uplink, while sharing the same time. And, in the TDD, a first time (Time 1) may be used for a downlink, and a second time (Time 2) may be used for an uplink, while sharing the same time. Furthermore, in the H-FDD, F1 and T1 may be used for the downlink, and F2 and T2 may be used for the uplink.

In the conventional system (e.g., LTE Rel-8), although the bandwidth for each of the uplink and the downlink may be configured to be different from one another, the conventional system basically supports the transmission and reception within a single carrier. However, as described above, the system according to the present invention may operate multiple carriers through carrier aggregation. Furthermore, the FDD system may also support the case when the number of carriers being aggregated and/or the bandwidth of the carriers respective to the uplink and the downlink are asymmetric.

In relation to a MAC-PHY (Media Access Control-Physical) interface, one HARQ (Hybrid Automatic Repeat reQuest) entity may exist for each single PHY, and one HARQ entity may exist for multiple PHYs, and multiple HARQs may exist for one PHY. In the description of the present invention, in the viewpoint of the user equipment (or user device), when it is given that spatial multiplexing is not available (or does not exist), this indicates that one HARQ entity exists in the system.

Hereinafter, Synchronization signals will be described in detail.

According to the present invention, 504 unique Physical Cell Identifiers (PCIs) exist. The PCI may be grouped to 168 unique PCI groups. Each group includes 3 unique PCIs. Each PCI may correspond to a portion of a single PCI group. The PCI should satisfy Equation 1 shown below.

$$N_{ID}^{cell} = 3N_{ID}^{(1)} + N_{ID}^{(2)}. \qquad [\text{Equation 1}]$$

In Equation 1, $N_{ID}^{cell}$ represents the PCI, $N_{ID}^{(1)}$ signifies any one of a random integer value ranging from 0 to 167, and $N_{ID}^{(2)}$ represents any one of a random integer value ranging from 0 to 2, each value indicating a PCI within a PCI group.

Sequence d(n), which used for a primary synchronization signal may be generated from a frequency domain Zadoff-Chu sequence. Herein, the sequence d(n) satisfies Equation 2 shown below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \qquad [\text{Equation 2}]$$

Herein, the Zadoff-Chu root sequence index u is shown below in Table 1.

TABLE

| $N_{ID}^{(2)}$ | Root index u |
|---|---|
| 0 | 25 |
| 1 | 29 |
| 2 | 34 |

The process of mapping a sequence to the resource element follows the frame structure. Herein, the user equipment does not assume that the primary synchronization signal is being transmitted through the same antenna port as a specific downlink reference signal. The user equipment does not assume that the transmission of a specific primary synchronization signal is transmitted to the same antenna port or to antenna ports that are used for transmitting another primary synchronization signal.

Herein, sequence d(n) is mapped to a resource element in accordance with Equation 3 shown below.

$$a_{k,l} = d(n), \quad n = 0, \ldots, 61$$
$$k = n - 31 + \frac{N_{RB}^{DL} N_{sc}^{RB}}{2}$$
[Equation 3]

In case of the first frame structure type, the primary synchronization signal is mapped to the last OFDM symbols of slot 0 and slot 10.

Meanwhile, in case of the second frame structure type, the primary synchronization signal is mapped to the third OFDM symbol in subframe 1 and subframe 6. In the OFDM symbol, resource element (k, l) are used for the transmission of the primary synchronization signal. At this point, the value of k satisfies Equation 4 shown below.

$$k = n - 31 + \frac{N_{RB}^{DL} N_{sc}^{RB}}{2}$$
$$n = -5, -4, \ldots, -1, 62, 63, \ldots 66$$
[Equation 4]

Hereinafter, a secondary synchronization signal will be described in detail.

Herein, sequence d(0), . . . , d(61), which is used for the secondary synchronization signal, is configured of two length-31 Group 2 sequences being interlaced and concatenated to one another.

The combination (or concatenation) of the two length-31 Group 2 sequences defining the secondary synchronization signal of subframe 0 is different from that of subframe 5. This satisfies Equation 5 shown below.

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$
[Equation 5]

In Equation 5, the condition of $0 \leq n \leq 30$ is satisfied. And, the values of $m_0$ and $m_1$ may be obtained from PCI group $N_{ID}^{(1)}$ in accordance with Equation 6 shown below.

$$m_0 = m' \bmod 31$$
$$m_1 = (m_0 + \lfloor m'/31 \rfloor + 1) \bmod 31$$
$$m' = N_{ID}^{(1)} - q(q+1)/2,$$
$$q = \left\lfloor \frac{N_{ID}^{(1)} + q'(q'+1)/2}{30} \right\rfloor,$$
$$q' = \lfloor N_{ID}^{(1)} / 30 \rfloor$$
[Equation 6]

The two sequences $s_0^{(m_0)}(n)$ and $s_1^{(m_1)}(n)$ are each defined as a different cyclic shift of m-sequence $\tilde{s}(n)$. Herein, $s_0^{(m_0)}(n)$ and $s_1^{(m_1)}(n)$ may be defined by Equation 7 shown below.

$$s_0^{(m_0)}(n) = \tilde{s}((n+m_0) \bmod 31)$$

$$s_1^{(m_1)}(n) = \tilde{s}((n+m_1) \bmod 31)$$
[Equation 7]

In Equation 7, the condition of $\tilde{s}(i) = 1 - 2x(i)$ is satisfied, and the condition of $0 \leq i \leq 30$ is also satisfied.

Furthermore, the value x satisfies Equation 8 shown below.

$$x(\bar{i}+5) = (x(\bar{i}+2) + x(\bar{i})) \bmod 2, \quad 0 \leq \bar{i} \leq 25$$
[Equation 8]

At this point, the initial value satisfies the conditions of x(0)=0, x(1)=0, x(2)=0, x(3)=0, x(4)=1. Two scrambling sequences $c_0(n)$ and $c_1(n)$ follow the primary synchronization signal and are each defined by a different cyclic shift of m-sequence $\tilde{c}(n)$. These values are obtained by using Equation 9 shown below.

$$c_0(n) = \tilde{c}((n + N_{ID}^{(2)}) \bmod 31)$$

$$c_1(n) = \tilde{c}((n + N_{ID}^{(2)} + 3) \bmod 31)$$
[Equation 9]

At this point, $N_{ID}^{(2)} \in \{0,1,2\}$ represents a PCI within the PCI group $N_{ID}^{(1)}$ and satisfies the condition of $\tilde{c}(i) = 1 - 2x(i)$. Herein, the value of I satisfies the condition of $0 \leq i \leq 30$. The value x satisfies the conditions of Equation 10 shown below.

$$x(\bar{i}+5) = (x(\bar{i}+3) + x(\bar{i})) \bmod 2, \quad 0 \leq \bar{i} \leq 25$$
[Equation 10]

At this point, the initial condition satisfies x(0)=0, x(1)=0, x(2)=0, x(3)=0, x(4)=1.

The scrambling sequences $z_1^{(m_0)}(n)$ and $z_1^{(m_1)}(n)$ are defined by acyclic shift of m-sequence $\tilde{z}(n)$. And, herein, $z_1^{(m_0)}(n)$ and $z_1^{(m_1)}(n)$ follows the conditions of Equation 11 shown below.

$$z_1^{(m_0)}(n) = \tilde{z}((n + (m_0 \bmod 8)) \bmod 31)$$

$$z_1^{(m_1)}(n) = \tilde{z}((n + (m_1 \bmod 8)) \bmod 31)$$
[Equation 11]

Equation 11 satisfies the conditions of $\tilde{z}(i) = 1 - 2x(i)$ and $0 \leq i \leq 30$, and the value x satisfies the conditions of Equation 12 shown below.

$$x(\bar{i}+5) = (x(\bar{i}+4) + x(\bar{i}+2) + x(\bar{i}+1) + x(\bar{i})) \bmod 2, \quad 0 \leq \bar{i} \leq 25$$
[Equation 12]

At this point, the initial condition satisfies x(0)=0, x(1)=0, x(2)=0, x(3)=0, x(4)=1.

Also, the values of $m_0$ and $m_1$ satisfy the conditions of Table 2. Table 2 shown below shows the mapping of $m_0$ and $m_1$ to the PCI group $N_{ID}^{(1)}$.

TABLE 2

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |

TABLE 2-continued

| $N_{ID}^{(1)}$ | $m_0$ | $m_1$ |
|---|---|---|
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Sequence mapping for resource elements follows a frame structure. In a subframe of a first frame structure type, and in a half frame of a second frame structure type, the same antenna port for the primary synchronization signal is used for the secondary synchronization signal.

Herein, sequence d(n) is mapped to a resource element in accordance with Equation 13 shown below.

$$a_{k,l} = d(n), \quad n = 0, \ldots, 61$$ [Equation 13]

$$k = n - 31 - \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

Resource element (k, l) satisfies the conditions of Equation 14 shown below.

$$k = n - 31 + \frac{N_{RB}^{DL} N_{sc}^{RB}}{2}$$ [Equation 14]

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots 66$$

Figure 13:
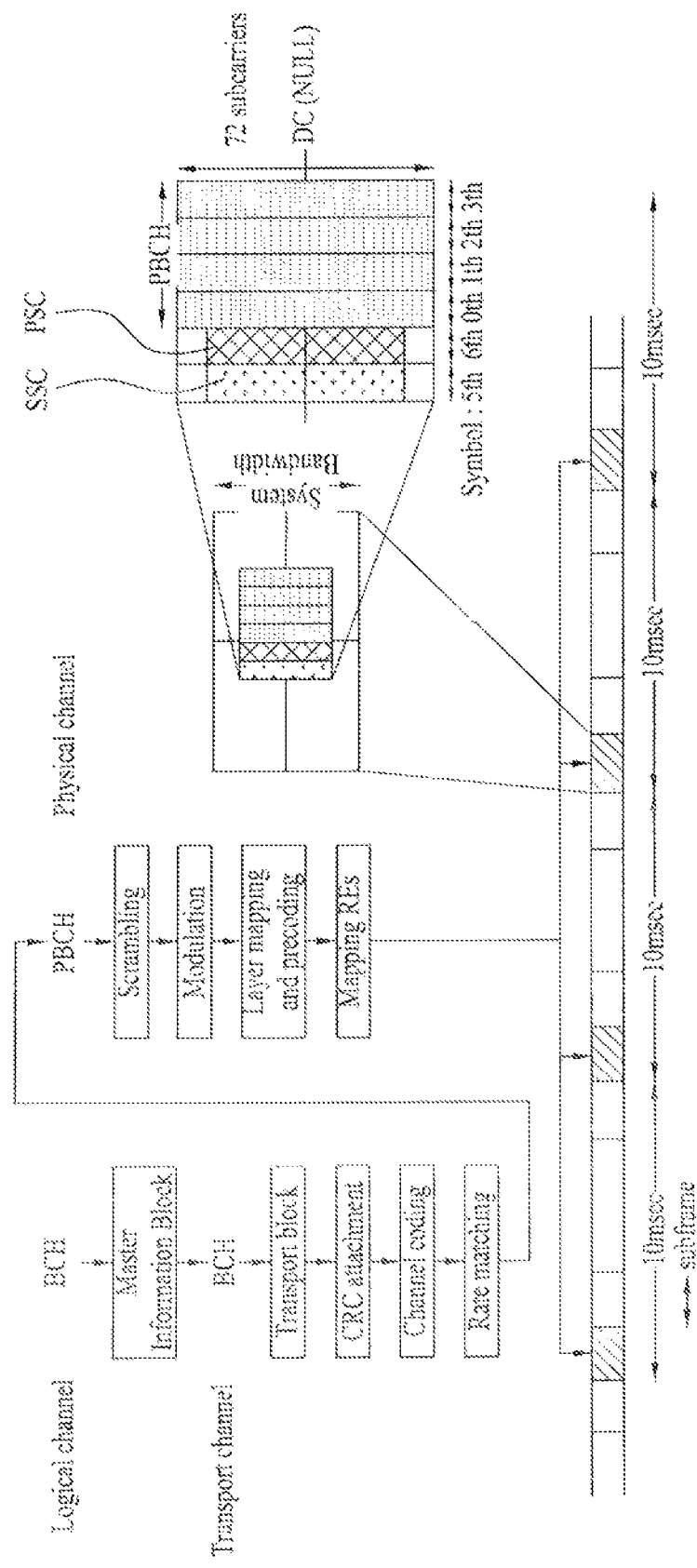
FIG. 13 illustrates the structure of a PBCH (Physical Broadcast Channel).

FIG. 13 illustrates the structure of a PBCH (Physical Broadcast Channel). As shown in FIG. 13, apart from the PBCH, a PSS (Primary Synchronization Signal) and an SSS (Secondary Synchronization Signal) are respectively mapped to the last two symbols of the first slot.

Figure 14:
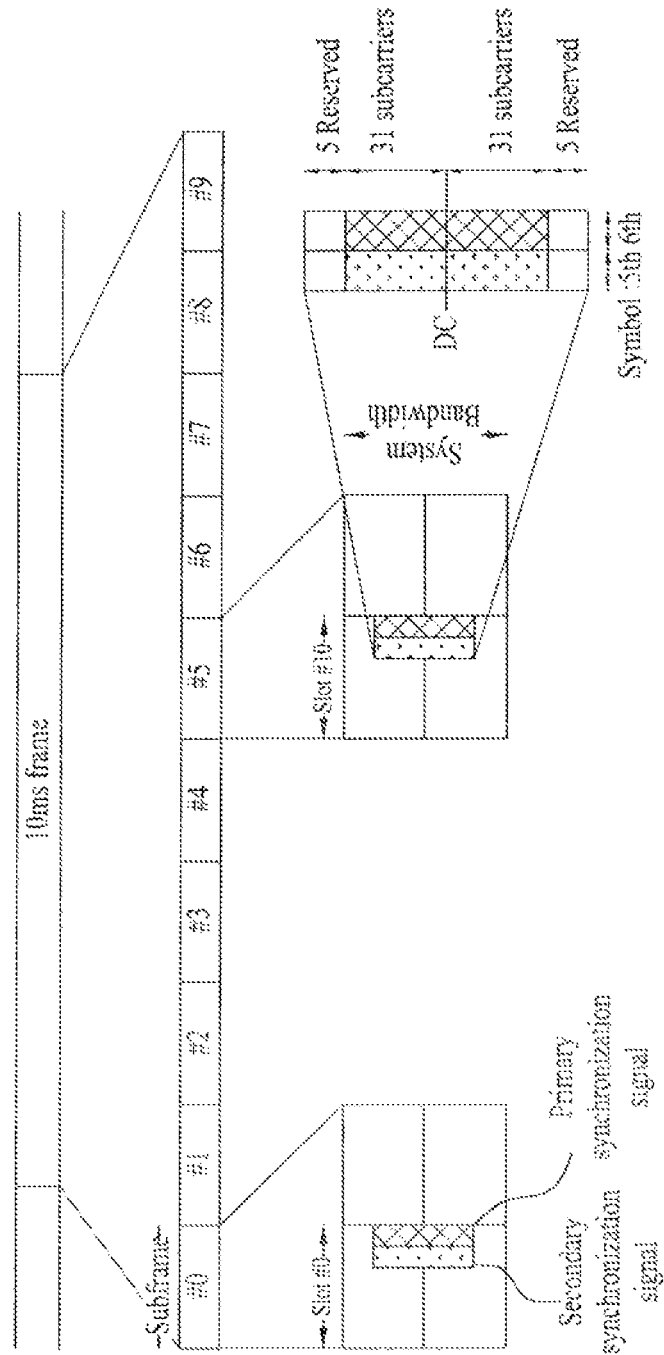
FIG. 14 illustrates the structures of a PSS and a SSS.

FIG. 14 illustrates the structures of a PSS and a SSS. As shown in FIG. 14, the PSS uses and transmits 72 subcarriers (10 subcarriers are separately left out, and PSS information is transmitted to 62 subcarriers) to the last OFDM symbol (the $6^{th}$ OFDM symbol in case a normal Cyclic Prefix, and the $5^{th}$ OFDM symbol in case of an extended Cyclic Prefix) of the first slot (slot 0, slot 10) of the $0^{th}$ and $5^{th}$ subframes within a 10 ms radio frame. Although the SSS has the same frequency and is assigned with the same slot allocation as the PSS, the SSS is mapped one symbol earlier than the PSS.

According to the present invention, cell search is performed by using the above-described PSS/SSS, and the cell search is performed for the time and frequency synchronization with the cell, and the cell search is also performed to obtain the PCI. During the PSS detection process, one PCI among 3 PCIs within the corresponding PCI group may be searched. And, during the SSS detection process, one PCI may be searched among 168 cell groups.

Hereinafter, the cell search process will be described in detail.

The cell search process refers to a procedure for gaining time and frequency synchronization with the cell and for searching a PCI of the corresponding cell.

First of all, the time synchronization will be described in detail.

A downlink radio link quality of a serving cell may be monitored by a user equipment for the purpose of notifying whether or not synchronization is established with a higher-level layer.

In a non-DRX (non Discontinuous Reception) mode, the physical layer of each user equipment accesses each radio frame with the calculated radio link quality during a previous time period.

During a DRX mode operation, the physical layer of the user equipment performs access with the calculated radio link quality during a previous time period at least once for each DRX cycle period.

In case the radio link quality is worse than a threshold value $Q_{out}$, the user equipment notifies that the physical layer is not in synchronization with the higher-level layer within the radio frame that is accessed with the radio link quality.

Additionally, in case the radio link quality is better than a threshold value $Q_{in}$, the user equipment notifies that the physical layer is in synchronization with the higher-level layer within the radio frame that is accessed with the radio link quality.

Meanwhile, a transmission timing control process will hereinafter be described in detail.

When a timing advance command is received, the user equipment controls (or adjusts) uplink transmission timing for the PUCCH/PUSCH/SRS. The timing advance command, which is indicated as $16^T$ s, notifies a change in an uplink timing associated with the current uplink timing.

In case of a random access response, an 11-bit timing advance command $T_A$ notifies an $N_{TA}$ value in accordance with $T_A=0, 1, 2, \ldots, 1282$ index values. At this point, the amount of timing alignment is given in accordance with $N_{TA}=T_A\times 16$.

In other cases, a 6-bit timing advance command $T_A$ notifies the adjustment of the current $N_{TA}$ value, $N_{TA,old}$, to a new $N_{TA}$ value, $N_{TA,new}$, in accordance with index values of $T_A=0, 1, 2, \ldots, 63$. At this point, the condition of equation $N_{TA,new}=N_{TA,old}+(T_A-31)\times 16$ is satisfied. Herein, at the uplink transmission point, the adjustment in the $N_{TA}$ value respective to a positive number or a negative number is notified to be preceded or delayed by the point of the positive number or the point of the negative number.

With respect to the timing advance command received in subframe n, the corresponding time point control may be applied starting from subframe n+6. When the uplink PUCCH/PUSCH/SRS transmission from subframe n and the uplink PUCCH/PUSCH/SRS transmission from subframe n+1 of the user device (or user equipment) overlaps one another due to the timing control, the user equipment completes the transmission of subframe n and does not transmit the portion of subframe n overlaying with subframe n+1.

If the received downlink time point is changed and not compensated, or if only a portion is compensated by the uplink timing control without receiving the timing advance command, the user equipment changes the $N_{TA}$.

A cell-specific reference signal may be transmitted from all downlink subframes in a cell that does not support MBSFN (Multi-Media Broadcast over a Single Frequency Network). In case the subframe is used for transmission along with the MBSFN, the first two OFDM symbols within the subframe may be used for the transmission of the cell-specific reference signal. The cell-specific reference signal is transmitted through one antenna port or multiple antenna ports 0 to 3. Herein, the cell-specific reference signal is defined with respect to $\Delta f=15$ kHz.

A reference signal sequence $r_{l,n_s}(m)$ may be defined by Equation 15 shown below.

$$r_{l,n_s}(m) = \frac{1}{\sqrt{2}}(1 - 2\cdot c(2m)) + j\frac{1}{\sqrt{2}}(1 - 2\cdot c(2m+1)),$$ [Equation 15]

$$m = 0, 1, \ldots, 2N_{RB}^{max,DL} - 1$$

At this point, in Equation 15, $n_s$ indicates a slot number within a single radio frame, and l represents an OFDM symbol number within the corresponding slot. Also, c(i) indicates a pseudo-random sequence, and a pseudo-random sequence generator is initiated to $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol.

At this point, the condition of $N_{CP}$ satisfies Equation 16 shown below.

$$N_{CP} = \begin{cases} 1 & \text{for normal } CP \\ 0 & \text{for extended } CP \end{cases} \quad \text{[Equation 16]}$$

Hereinafter, a method for mapping a reference signal to a resource element will be described in detail.

Based upon Equation 17 shown below, a reference signal sequence $r_{l,n_s}(m)$ is mapped to a complex value modulation symbol $a_{k,l}^{(p)}$, which is used as a reference symbol respective to antenna port p in slot $n_s$.

$$a_{k,l}^{(p)} = r_{l,n_s}(m') \quad \text{[Equation 17]}$$

At this point, the values of k, l, m, and m' may be obtained by using Equation 18 shown below.

$$k = 6m + (v + v_{shift}) \bmod 6 \quad \text{[Equation 18]}$$
$$l = \begin{cases} 0, N_{symb}^{DL} - 3 & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$

In Equation 18, variables v and $v_{shift}$ define the positions within the frequency domain respective to the reference signals, each being different from one another. And, the value v may be obtained by using Equation 19 shown below.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 19]}$$

A cell-specific frequency shift is given by using the equation $v_{shift}=N_{ID}^{cell} \bmod 6$.

Figure 15:
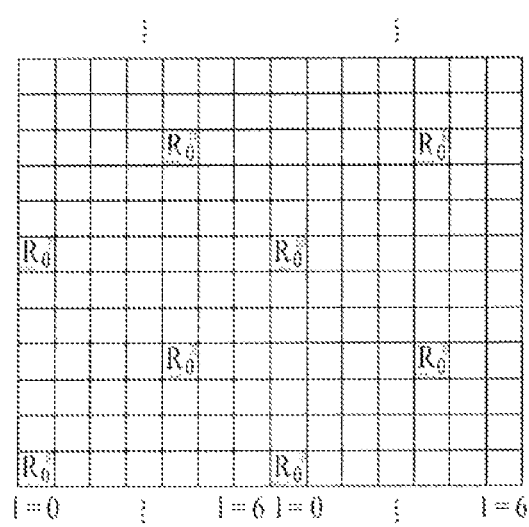
FIG. 15 illustrates a resource element that is used for transmitting a reference signal, when the number of antenna ports is equal to 1, and when the cyclic shift corresponds to a normal cyclic shift.
Figure 16:
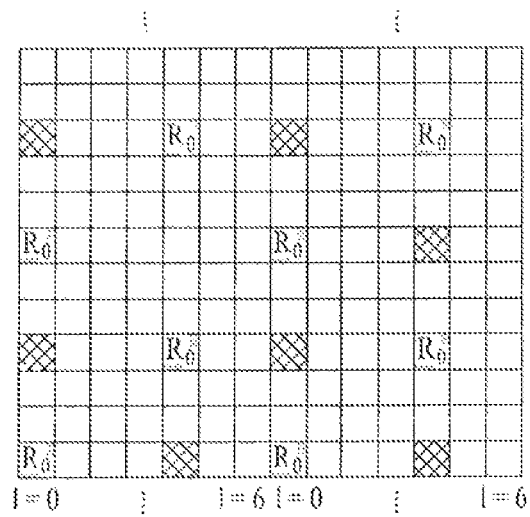
FIG. 16 illustrates a resource element that is used for transmitting a reference signal, when the number of antenna ports is equal to 2, and when the cyclic shift corresponds to a normal cyclic shift.
Figure 16:
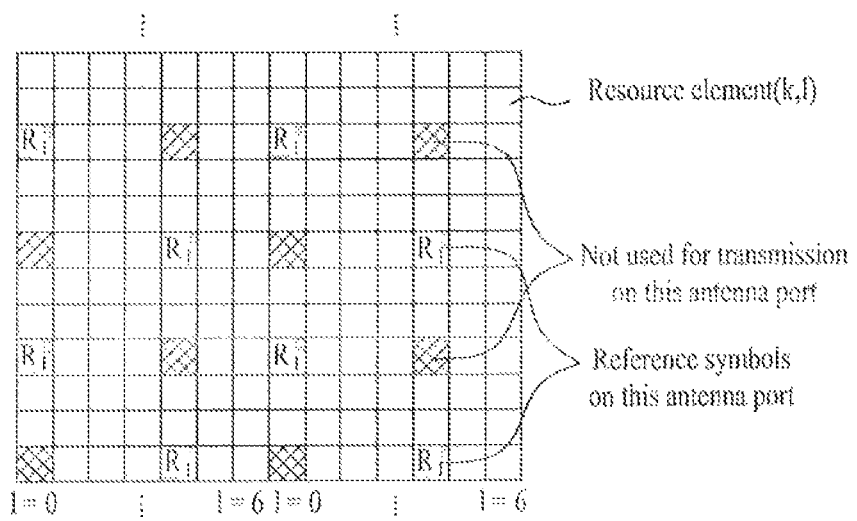
Figure 17A:
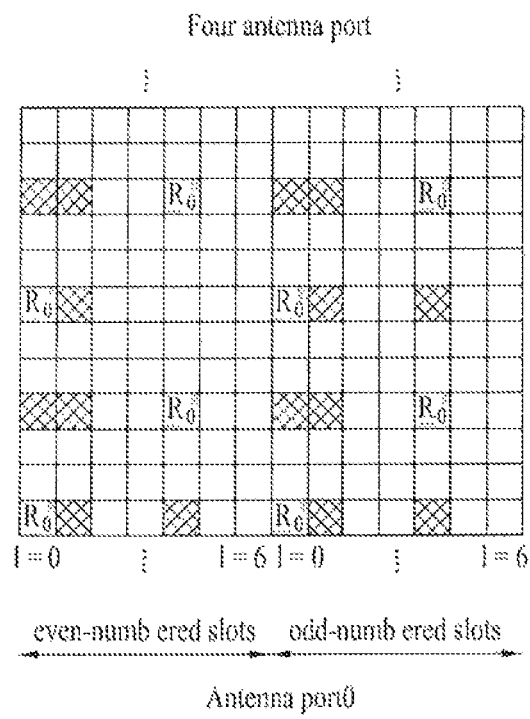
FIG. 17a and FIG. 17b illustrate a resource element that is used for transmitting a reference signal, when the number of antenna ports is equal to 4, and when the cyclic shift corresponds to a normal cyclic shift.
Figure 17A:
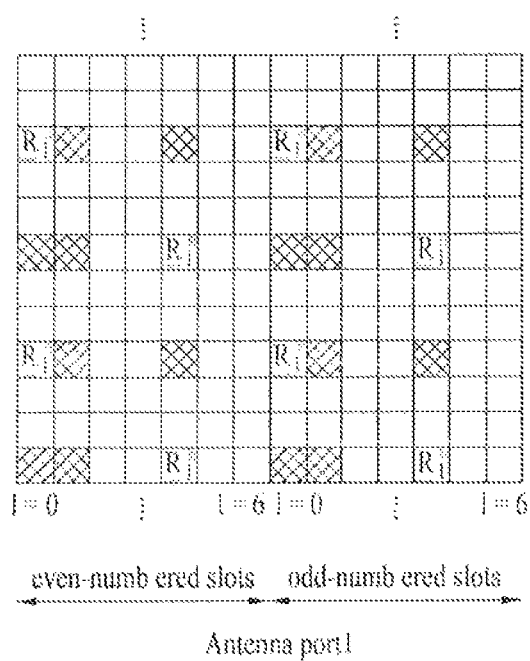
Figure 17B:
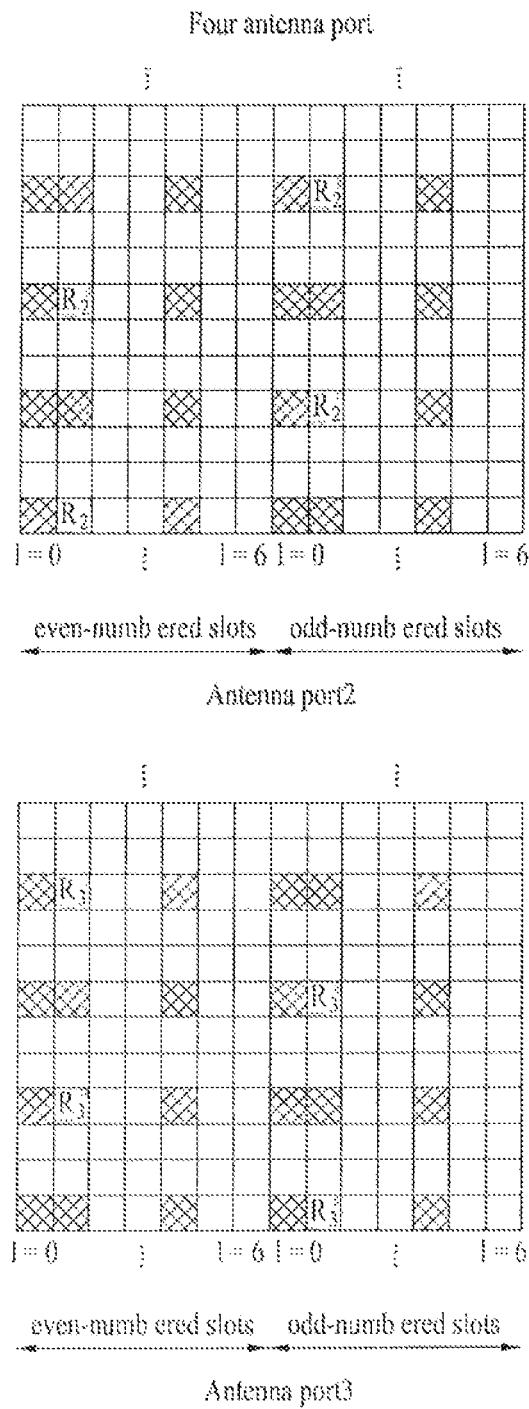
Figure 18:
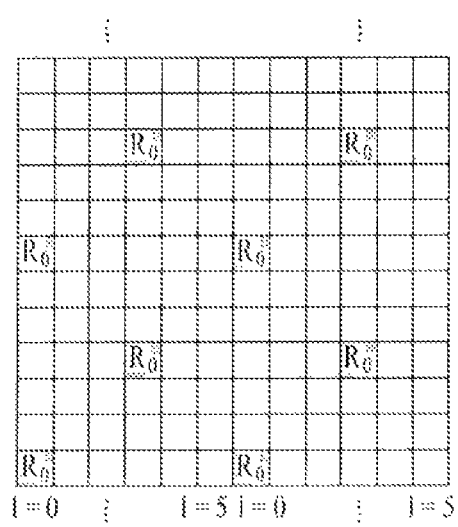
FIG. 18 illustrates a resource element that is used for transmitting a reference signal, when the number of antenna ports is equal to 1, and when the cyclic shift corresponds to an extended cyclic shift.
Figure 19:
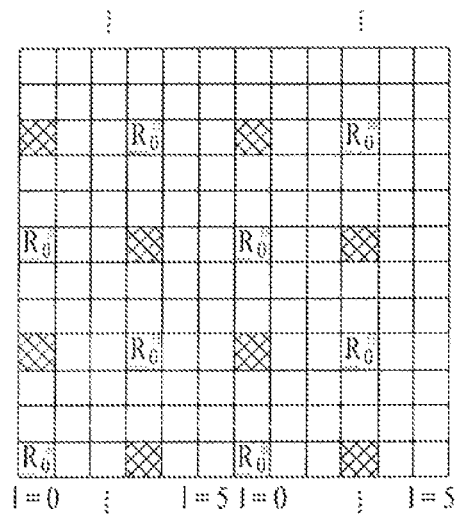
FIG. 19 illustrates a resource element that is used for transmitting a reference signal, when the number of antenna ports is equal to 2, and when the cyclic shift corresponds to an extended cyclic shift.
Figure 19:
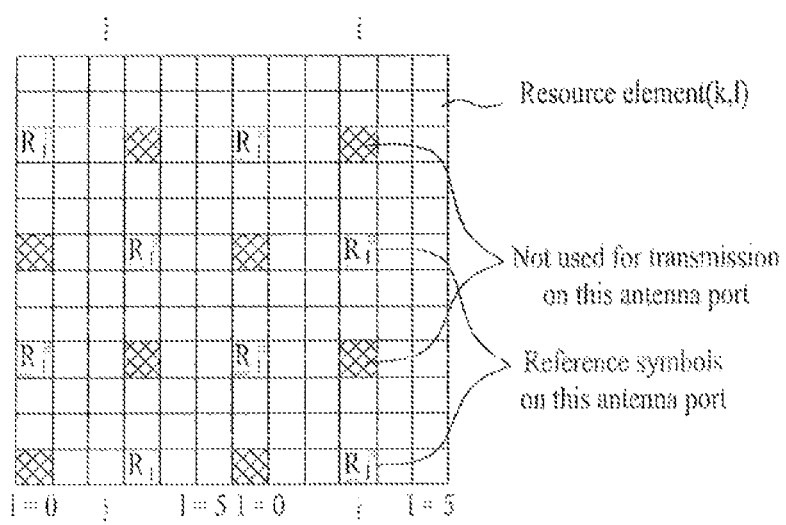
Figure 20A:
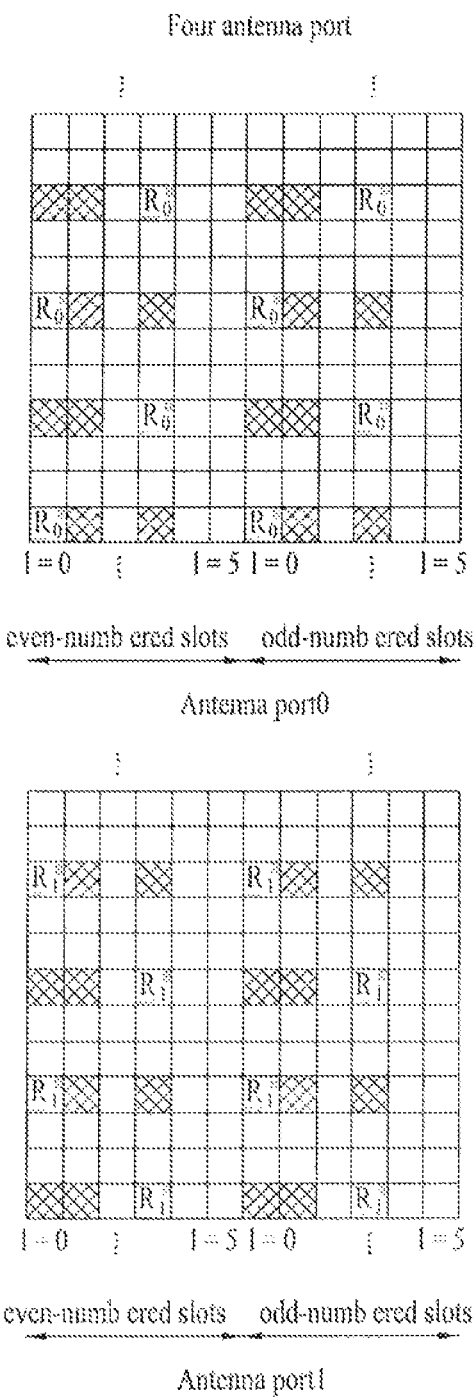
FIG. 20a and FIG. 20b illustrate a resource element that is used for transmitting a reference signal, when the number of antenna ports is equal to 4, and when the cyclic shift corresponds to an extended cyclic shift.
Figure 20B:
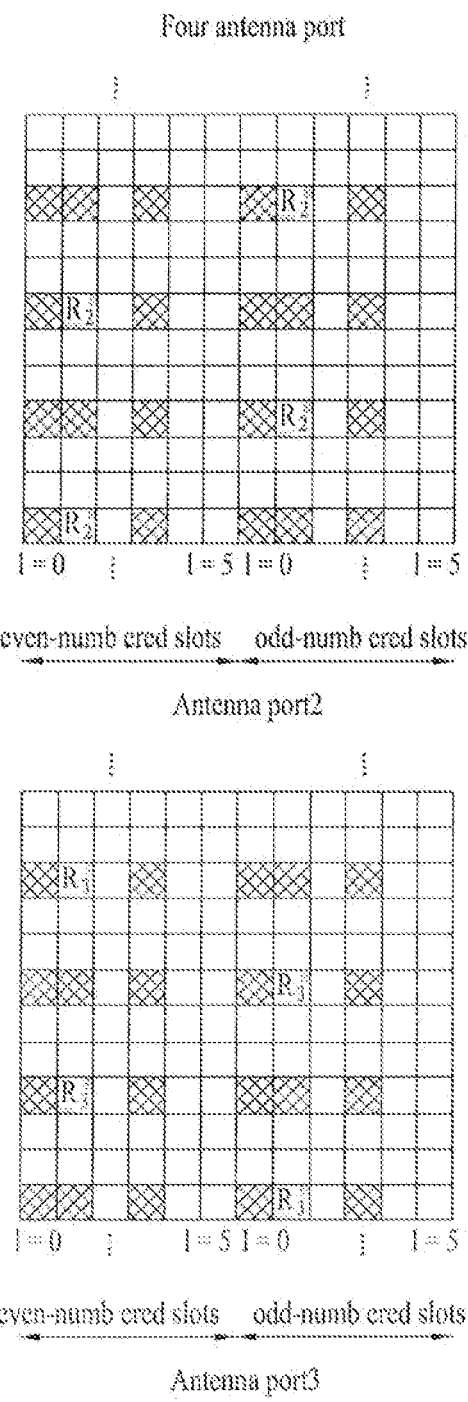

Resource element (k, l), which is used for reference signal transmission through a random antenna port within a single slot shall not be used for any transmission of another antenna port within the same slot. FIG. 15 to FIG. 17 illustrate examples of resource elements that are used for reference signal transmission in case of a normal cyclic prefix. FIG. 15 to FIG. 16 respectively illustrate examples of a resource element that is used for transmitting a reference signal, when the number of antenna ports is equal to 1 and when the number of antenna ports is equal to 2. And, FIG. 17a and FIG. 17b illustrate a resource element that is used for transmitting a reference signal, when the number of antenna ports is equal to 4. FIG. 18 to FIG. 20 illustrate examples of resource elements that are used for reference signal transmission in case of an extended cyclic prefix. FIG. 18 and FIG. 19 respectively illustrate examples a resource element that is used for transmitting a reference signal, when the number of antenna ports is equal to 1, and when the number of antenna ports is equal to 2. And, FIG. 20a and FIG. 20b illustrate a resource element that is used for transmitting a reference signal, when the number of antenna ports is equal to 4. The carrier frequency respective to the uplink and the downlink and the bandwidth size are configured in a EAR-FCN (E-UTRA Absolute Radio Frequency Channel Number) format, thereby being transmitted as system information. In case of the FDD, an uplink band and a downlink band each being different from one another may form a pair so as to be used. And, the EARFCN respective to the uplink band is transmitted to the user equipment. If multiple neighboring cells each being differentiated from one another by the frequency band exist, EARFCN information respective to such neighboring cell are broadcasted as system information for the handover to such neighboring cells.

Table 3 shown below shows a list of channel number of the frequency band for the E-UTRA.

TABLE 3

| E-UTRA Operating Band | Downlink | | | Uplink | | |
|---|---|---|---|---|---|---|
| | $F_{DL\_low}$ | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | ... | ... | ... | ... | ... | ... |
| 17 | 734 | 5730 | 5730-5849 | 704 | 23730 | 23730-23849 |
| ... | ... | ... | ... | ... | ... | ... |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-38249 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

The EARFCN for downlink and the carrier frequency (MHz) shown in Table 3 satisfy the conditions of Equation 20 shown below.

$$F_{DL}=F_{DL\_low}+0.1(N_{DL}-N_{Offs-DL})$$ [Equation 20]

In Equation 20, $F_{DL}$ indicates a maximum frequency limit of the corresponding band, and $F_{DL\_low}$ indicates a minimum frequency limit of the corresponding frequency band. Also, $N_{Offs-DL}$ represents an offset value, and $N_{DL}$ of the corresponding band signifies downlink EARFCN.

The EARFCN for uplink and the carrier frequency (MHz) shown in Table 3 satisfy the conditions of Equation 21 shown below.

$$F_{UL}=F_{UL\_low}+0.1(N_{UL}-N_{Offs-UL})$$ [Equation 21]

In Equation 21, $F_{UL}$ indicates a maximum frequency limit of the corresponding band, and $F_{UL\_low}$ indicates a minimum frequency limit of the corresponding frequency band. Also, $N_{Offs-UL}$ represents an offset value, and $N_{UL}$ of the corresponding band signifies downlink EARFCN.

Table 4 below shows a table listing differences in received channels respective to a default E-UTRA transmission channel (carrier centered frequency).

TABLE 4

| Frequency Band | Difference in Carrier Centered Frequency between the Transmitting Band and the Receiving Band |
|---|---|
| 1 | 190 MHz |
| 2 | 80 MHz |
| 3 | 95 MHz |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

The downlink component carrier broadcasts a global cell ID (GCI (Global Cell ID) or EGCI (Evolved Global Cell ID)) and a Physical Cell ID (PCI) as SI. The GCI corresponds to an ID that exists uniquely for each cell, and the PCI corresponds to an ID for identifying a cell in accordance with the characteristics of a physical layer. The global cell ID and the physical cell ID may be used as a carrier identifier.

The global cell ID may be identified by the user equipment due to an SIBI, and the global cell ID may be signaled to the user equipment for an inter-RAT (Radio Access Technology) Handover, positioning, and so on. For the detailed description of the global cell ID, reference may be made to related standard documents (e.g., 3GPP TS36.331).

As an example of the carrier identifier, the description of the present invention is mostly focused on the PCI. However, the present invention will not be limited only to the example given herein.

And, the diverse embodiments of the present invention may also be equally applied to other carrier identifiers (e.g., global cell ID). In the uplink component carrier PCI (Physical Cell ID), which is already-defined in the conventional system, operations that are associated with operations detected in the downlink component carrier, such as generating a physical control channel, a data channel, a physical signal, a reference signal sequence, initializing a scrambling code, performing cyclic shift, selecting a root sequence, creating a hopping pattern, and so on, may also be applied to the uplink component carrier according to the present invention.

The component carrier refers to an element carrier configuring multiple carriers. More specifically, a plurality of component carriers configures multiple carriers through carrier aggregation. Also, the component carrier includes a plurality of lower bands. At this point, when the term multiple carrier is replaced with the term overall band, an aggregation of the component carrier may also be referred to as a bandwidth aggregation. The term subband may be replaced with the term lower partial band. Furthermore, carrier aggregation refers to grouping multiple carriers and extending the grouped multiple carriers in order to increase the data rate. For example, in the conventional system, one carrier is 20 MHz, and, in the multiple carrier system, five (5) 20 MHz carriers are grouped (or aggregated), thereby extending the bandwidth to 100 MHz. Moreover, carrier aggregation includes aggregating multiple carriers each belonging to a different frequency band.

According to the present invention, the configuration of carrier aggregation may be configured to be cell-specific or UE-specific.

Figure 21:
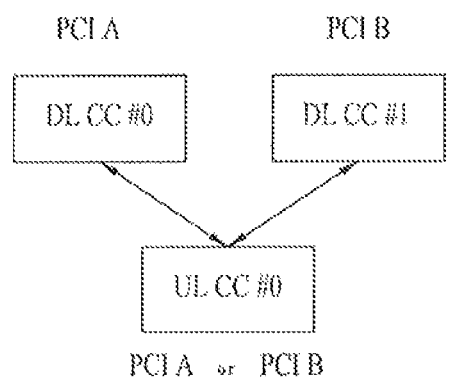
FIG. 21 illustrates an exemplary case when the number of downlink component carriers is greater than the number of uplink component carriers.

FIG. 21 illustrates an exemplary case when the number of downlink component carriers is greater than the number of uplink component carriers. FIG. 21 illustrates a case when the number of downlink component carriers and the number of uplink component carriers are asymmetrical due to carrier aggregation. As shown in FIG. 21, when the number of downlink component carriers and the number of uplink component carriers are asymmetrical because the number of downlink component carriers is greater than the number of uplink component carrier, a one-to-one correspondence between the uplink component carrier and the downlink component carrier, which is predefined in Table 3, cannot be applied. In this situation, when 2 downlink component carriers connected to one uplink component carrier use the same PCI, a confusion may occur when performing PCI-based operations in the uplink component carrier as to which downlink component carrier PCI is to be used.

Figure 22:
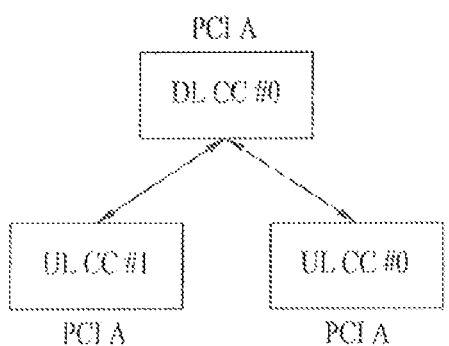
FIG. 22 illustrates an exemplary case when the number of uplink component carriers is greater than the number of downlink component carriers.

Meanwhile, FIG. 22 illustrates an exemplary case when the number of uplink component carriers is greater than the number of downlink component carriers. As shown in FIG. 22, based upon the PCI detected in one downlink component carrier, two uplink component carriers perform PCI-related operations, and the confusion occurring in FIG. 21 can be prevented.

However, based upon the same PCI, when performing operations, such as generating a physical control channel, a data channel, a physical signal, a reference signal sequence, initializing a scrambling code, performing cyclic shift, selecting a root sequence, creating a hopping pattern, and so on, in 2 uplink component carriers, a problem of having an increase occurring in the PAPR (Peak-to-Average Power Ratio).

In order to simplify the description of the present invention, it will be assumed that the carrier aggregation is configured as described below. Hereinafter, it will be assumed that the number of downlink component carriers and the number of uplink component carriers configure component carriers asymmetrical to one another, and it will also be assumed that, among the plurality of downlink component carriers, at least one or more downlink component carriers include a BCC (Backward compatible Component Carrier), and that at least one of the remaining downlink component carriers include a NBCC (Non-Backward compatible Component Carrier). At this point, the PCI used in each carrier component may be identical to one another or may be different from one another. Hereinafter, a rule for signaling or allocating the PCI will be described in detail.

Figure 23:
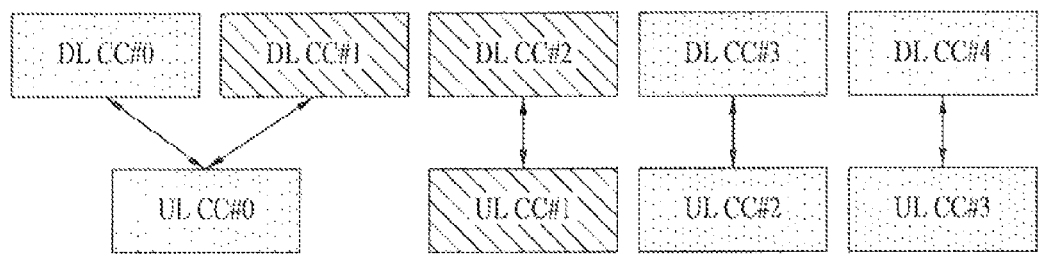
FIG. 23 illustrates a case when the number of uplink component carriers and the number of downlink component carriers are asymmetrical according to an exemplary embodiment of the present invention.

FIG. 23 illustrates a case when the number of uplink component carriers and the number of downlink component carriers are asymmetrical according to an exemplary embodiment of the present invention. As shown in FIG. 23, the number of downlink component carriers is equal to 5, and the number of uplink component carriers is equal to 4. Accordingly, there may occur a case when the number of downlink component carriers is different from the number of uplink component carriers. In this case, a one-to-one correspondence between the uplink component carriers and the downlink component carriers, which is predefined in Table 3, cannot be applied. Accordingly, a preferable method for performing operations associated to the carrier identifier will hereinafter be described in detail. In the following exemplary embodiments of the present invention, although the description of the present invention is focused on the case when the carrier identifier corresponds to the physical cell ID (PCI) for simplicity, the present invention will not be limited only to the examples given herein. More specifically, as described above, in addition to the PCI, a global cell ID (GCI or EGCI) may be used as the carrier identifier. Furthermore, it will be apparent that the exemplary embodiments of the present invention, which will hereinafter be described in detail, may be equally applied to a case when the global cell ID is used.

First Embodiment

Figure 24:
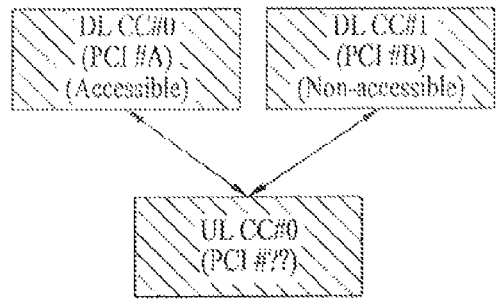
FIG. 24 illustrates a case when the number of uplink component carriers is in a two-to-one (2:1) correspondence with the number of downlink component carriers according to an exemplary embodiment of the present invention.

As accessible downlink component carrier refers to a component carrier by which the user device (or user equipment) may perform initial access, due to the presence of a downlink synchronization signal. FIG. 24 illustrates a case when the number of uplink component carriers is in a two-to-one (2:1) correspondence with the number of downlink component carriers according to an exemplary embodiment of the present invention. Referring to FIG. 24, one of the two(2) downlink component carriers corresponds to a BCC, and the other corresponds to an NBCC. As shown in FIG. 24, as a BCC, downlink component carrier #0 (DL CC#0) uses PCI #A to transmit a downlink signal, and, as an NBCC, downlink component carrier #1 (DL CC#1) uses PCI #B to transmit a downlink signal. At this point, PCI #A and PCI #B may have the same value or may have different values. A user equipment that performs initial access through DL CC#0 may perform any one of the five operations listed below.

1) Uplink transmission is performed by using PCI #B, which is detected in DL CC#1. At this point, an uplink signal that is transmitted by using PCI #A and an uplink signal that is transmitted by using PCI #B may co-exist in UL CC#0.

2) PCI #A used in DL CC#0 is notified to the user equipment through cell-specific broadcasting, or through a user equipment RRC (Radio Resource Control) signal, from DL CC#1, thereby performing an uplink transmission, which is required for initial access, and control transmission and reception of data and control information. At this point, in UL CC#0, all uplink transmission (including initial access and data and control information) may be performed by using PCI #A.

3) PCI #A used in DL CC#0 is notified to the user equipment through cell-specific broadcasting, or through a cell-specific or user equipment RRC (Radio Resource Control) signal, from UL CC#0, thereby performing an uplink transmission, which is required for initial access, and control transmission and reception of data and control information.

4) Both 2) and 3) may be applied.

5) A temporary or permanent random PCI #C, which is to be used for performing uplink access for the initial access, and which is also used for transmitting at least one of uplink data and control channel, may be signaled through cell-specific broadcasting, or through a user equipment RRC (Radio Resource Control) signal, from DL CC#1, so as to perform transmission and reception. At this point, the base station may randomly configure the PCI #C value. Meanwhile, in case PCI #A and PCI #C are identical to one another, in uplink CC#0, the same PCI may be used to transmit an uplink signal.

Second Embodiment

Figure 25:
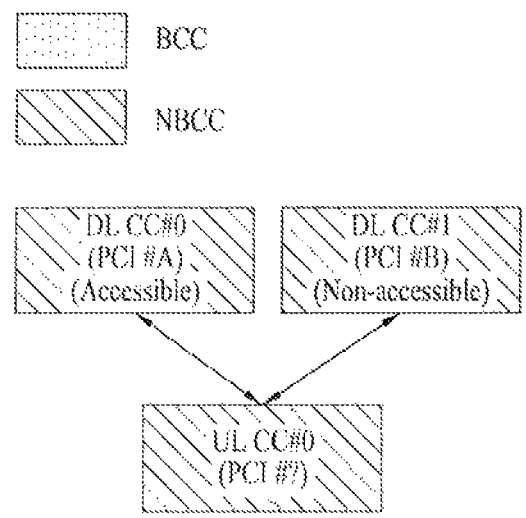
FIG. 25 illustrates a case when the number of uplink component carriers is in a two-to-one (2:1) correspondence with the number of downlink component carriers according to an exemplary embodiment of the present invention.

FIG. 25 illustrates a case when the number of uplink component carriers is in a two-to-one (2:1) correspondence with the number of downlink component carriers according to an exemplary embodiment of the present invention. Referring to FIG. 25, DL CC#0 corresponds to an accessible component carrier that can not only perform initial access in UL CC#0 by using PCI #A, which is detected from a downlink synchronization signal, but also perform transmission of data and control channel. For the user equipment, which may perform initial access through DL CC#0, and which may perform operations for the connection between DL CC#0 and UL CC#0, the network and the user equipment may perform the methods listed below. Meanwhile, as a Non-accessible component carrier, DL CC#1 refers to a component carrier through which at least one or more of the physical signals for initial access (e.g., synchronization signal, broadcast channel, CRC (Common Reference Signal)) are not transmitted.

1) By using PCI #A, which is detected from the downlink synchronization signal of DL CC#0, UL CC#0 may not only perform initial access but also perform transmission of data and control channel.

2) UL CC#0 may signal PCI #C, which is to be used for the initial access or the transmission of at least one of data and control channel, through cell-specific broadcasting, or through a user equipment RRC (Radio Resource Control) signal, of DL CC#0.

3) PCI #B, which is to be used when performing downlink transmission from DL CC#1, may be broadcasted, or RRC may be signaled, so as to transmit the downlink signals. At this point, the uplink signal being transmitted from UL CC#0 may follow PCI #B. Furthermore, in case PCI #A and PCI #B are identical to one another, UL CC#0 may use the same PCI to transmit the uplink signal.

4) For the user equipment, which receives the downlink signal from DL CC#1, and which is to transmit the uplink signal by using UL CC#0, PCI #C that is used in UL CC#0 may be broadcasted or RRC signaled. Herein, DL CC#0 shall decide in advance that DL CC#0 will perform transmission by using PCI #C, thereby enabling the user equipment to receive the DL signal. Furthermore, in case PCI #A and PCI #C are identical to one another, uplink UL CC#0 may use the same PCI to transmit the uplink signal.

5) Each of PCI #D that is to be used by DL CC#1 and PCI #E that is to be used by UL CC#1 may be broadcasted or RRC signaled.

In the above-described second embodiment of the present invention, an example wherein the number of downlink component carriers and the number of uplink component carriers are asymmetrical is given in order to simplify the description of the present invention. However, the present invention will not be limited only to the example given herein. And, therefore, the present invention may also be equally applied to a case when uplink component carriers and downlink component carriers, which are configured through carrier aggregation, do not correspond to pairs establishing a one-to-one correspondence between the downlink component carriers and the uplink component carriers pre-defined in the conventional system (e.g., Rel-8). For example, when it is given that, for the user equipment, two(2) downlink component carriers (DL#0 and DL#1) and two(2) uplink component carriers (UL#0 and UL#1) are configured, only DL #0 and UL #0 may correspond to a downlink component carrier and uplink component carrier pair, which is pre-defined in the conventional system. In this case, DL#1 and UL#1 may not correspond to a downlink component carrier and uplink component carrier pair, which is pre-defined in the conventional system. In this case, the present invention may be directly applied to DL#1 and UL#1 without any modification.

Furthermore, according to the exemplary embodiments of the present invention, the physical cell ID (PCI) is given as an example of the carrier identifier. However, the present invention will not be limited only to the example given herein. And, the diverse characteristics of the exemplary embodiments of the present invention may also be equally applied to a case when the global cell ID (GCI or EGCI) is used instead of the PCI.

Figure 26:
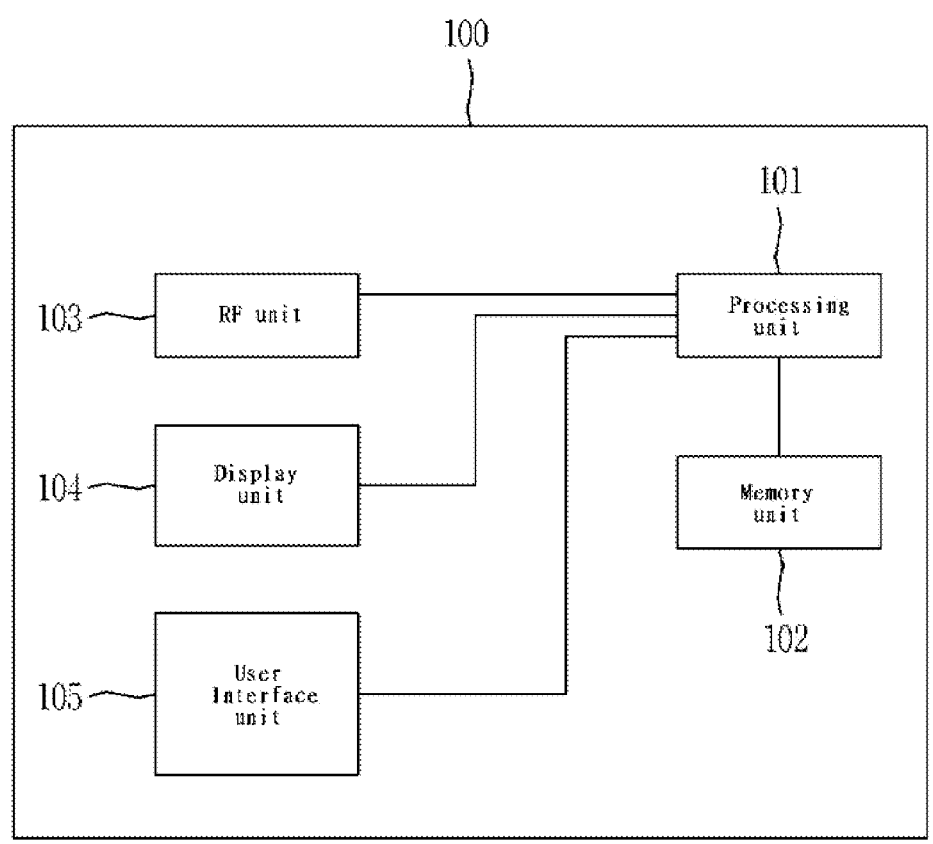
FIG. 26 illustrates a block view showing the structure of a device that can be applied to the base station and user equipment according to the present invention and that can perform the above-described method according to the present invention.

FIG. 26 illustrates a block view showing the structure of a device that can be applied to the base station and user equipment according to the present invention and that can perform the above-described method according to the present invention. The above-described exemplary embodiments of the present invention may be performed by the device shown in FIG. 26. As shown in FIG. 26, the device (100) includes a processing unit (101), a memory unit (102), an RF (Radio Frequency) unit (103), a display unit (1044), and a user interface unit (105). A layer of a physical interface protocol is performed in the processing unit (101). The processing unit (101) provides a control plane and a user plane. The function of each layer may be performed by the processing unit (101). The processing unit (101) may perform the above-described embodiments of the present invention. More specifically, the processing unit (101) may decide a subframe which is used for positioning the user equipment, or the processing unit (101) may receive a subframe so as to perform the function of positioning the user equipment. The memory unit (102) is electrically connected to the processing unit (101) and stores operating systems, applications, and general files. If the device (100) corresponds to the user equipment, the display unit may display diverse information and may be implemented by using the disclosed LCD (Liquid Crystal Display), OLED (Organic Light Emitting Diode), and so on. The user interface unit (105) may be configured by combining disclosed user interfaces, such as a keypad, a touchscreen, and so on. The RF unit (103) is electrically connected to the processing unit (101) and may transmit or receive radio signals.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the term User Equipment (UE) may be replaced with other terms, such as MS (Mobile Station), SS (Subscriber Station), MSS (Mobile Subscriber Station), or mobile terminal.

Meanwhile, a PDA (Personal Digital Assistant), a cellular phone, a PCS (Personal Communication Service) phone, a GSM (Global System for Mobile) phone, a WCDMA (Wideband CDMA) phone, an MBS (Mobile Broadband System) phone, and so on, may be used as the UE of the present invention.

The embodiments of the present invention may be realized by a variety of means. For example, the embodiments of the present invention may be realized as hardware, firmware, or software, or in a combined form of two or more of hardware, firmware, and software.

When configuring the embodiment of the present invention in the form of hardware, a method according to the embodiments of the present invention may be realized by using one or more of ASICs (application specific integrated circuits), DSPs (digital signal processors), DSPDs (digital signal processing devices), PLDs (programmable logic devices), FPGAs (field programmable gate arrays), a processor, a controller, a micro-processor, a micro-controller, and so on.

When configuring the embodiment of the present invention in the form of firmware or software, a method according to the embodiments of the present invention may be realized in the form of a module, procedure, or mathematical function performing the functions or operations described in the specification of the present invention. A software code may be stored in a memory unit so as to be configured by a processor. The memory unit may be placed inside or outside of the processor, thereby being capable of sending and receiving data with the processor through a variety of previously disclosed means.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The present invention may be applied to a user equipment, base station, or other equipments of a wireless mobile communication system.

What is claimed is:

1. A method for a terminal supporting carrier aggregation of multiple component carriers configured for the terminal, the terminal configured to operate in a communication system, the method comprising:
    performing, by the terminal, a cell search during an initial access procedure on a first component carrier,
    wherein the cell search includes receiving synchronization signals on the first component carrier for detecting component carrier identifier information for the first component carrier and for performing a time and frequency synchronization with the first component carrier:
    receiving, by the terminal via the first component carrier, a Radio Resource Control (RRC) signal including component carrier identifier information indicating a second component carrier among the multiple component carriers configured for the terminal, after the terminal has performed the cell search on the first component carrier; and
    performing, by the terminal, an access procedure on the second component carrier,
    wherein the access procedure is performed by using the component carrier identifier information received via the first component carrier to adjust a transmission timing in the second component carrier to correspond to the time synchronization of the first component carrier,
    wherein the access procedure includes transmitting a random access preamble on the second component carrier without previously performing a synchronization procedure on the second component carrier.

2. The method of claim 1, wherein the first component carrier consists of a downlink component carrier.

3. The method of claim 1, wherein, in the multiple component carriers, at least one downlink component carrier and at least one uplink component carrier are asymmetric in numbers.

4. A terminal supporting carrier aggregation of multiple component carriers configured for the terminal, the terminal configured to operate in a communication system, the method comprising:
    a transmitting unit; a receiving unit; and a control unit,
    wherein the control unit is configured to:
    perform a cell search during an initial access procedure on a first component carrier,
    wherein the cell search includes receiving synchronization signals on the first component carrier so for detecting component carrier identifier information for the first component carrier and for performing a time and frequency synchronization with the first component carrier;
    receive, via the first component carrier, a Radio Resource Control (RRC) signal including component carrier identifier information indicating a second component carrier among the multiple component carriers configured for the terminal, after the terminal has performed the cell search on the first component carrier; and
    perform an access procedure on the second component carrier, wherein the access procedure is performed b using the component carrier identifier information received via the first component carrier to adjust a transmission timing in the second component carrier to correspond to the time synchronization of the first component carrier,
    wherein the access procedure includes transmitting a random access preamble on the second component carrier without previously performing a synchronization procedure on the second component.

5. The terminal of claim 4, wherein the first component carrier consists of downlink component carrier.

6. The terminal of claim 4, wherein, in the multiple component carriers, at least one downlink component carrier and at least one uplink component carrier are asymmetric in numbers.

* * * * *